United States Patent
Kateb

(10) Patent No.: US 12,383,860 B2
(45) Date of Patent: Aug. 12, 2025

(54) TRI-ETHYLENE GLYCOL CIRCULATION AUTOMATION SYSTEM AND METHOD

(71) Applicant: Saudi Arabian Oil Company, Dhahran (SA)

(72) Inventor: Abdulrazzaq A. Kateb, Shaybah (SA)

(73) Assignee: Saudi Arabian Oil Company, Dhahran (SA)

( * ) Notice: Subject to any disclaimer, the term of this patent is extended or adjusted under 35 U.S.C. 154(b) by 720 days.

(21) Appl. No.: 17/652,163

(22) Filed: Feb. 23, 2022

(65) Prior Publication Data

US 2023/0264139 A1 Aug. 24, 2023

(51) Int. Cl.
| | |
|---|---|
| *B01D 53/14* | (2006.01) |
| *B01D 53/26* | (2006.01) |
| *B01D 53/28* | (2006.01) |
| *G05B 19/41* | (2006.01) |
| *G05B 19/416* | (2006.01) |

(52) U.S. Cl.
CPC ....... *B01D 53/1412* (2013.01); *B01D 53/261* (2013.01); *B01D 53/28* (2013.01); *G05B 19/416* (2013.01); *B01D 2252/2026* (2013.01); *G05B 2219/37371* (2013.01)

(58) Field of Classification Search
CPC .. B01D 53/1412; B01D 53/261; B01D 53/28; B01D 2252/2026; G05B 19/416; G05B 2219/37371
See application file for complete search history.

(56) References Cited

U.S. PATENT DOCUMENTS

| | | | |
|---|---|---|---|
| 3,151,959 A | 10/1964 | Wymore et al. | |
| 4,005,997 A | 2/1977 | Fowler et al. | |
| 10,124,286 B2 * | 11/2018 | McMahon | F25J 3/0209 |
| 10,184,090 B2 | 1/2019 | Marak et al. | |
| 2013/0186268 A1 * | 7/2013 | Hill | C10L 3/106 95/10 |
| 2019/0186819 A1 * | 6/2019 | Noureldin | F28D 9/0006 |
| 2020/0048168 A1 | 2/2020 | Sibal | |

OTHER PUBLICATIONS

SAIP Exam in Saudi Arabian Appln No. 123441260, dated Jun. 21, 2024, 14 pages.

* cited by examiner

*Primary Examiner* — Youngsul Jeong
(74) *Attorney, Agent, or Firm* — Fish & Richardson P.C.

(57) ABSTRACT

A tri-ethylene glycol (TEG) circulation system and method is implemented by a computer system, which periodically receives, from a temperature sensor and a flow sensor, respectively, a temperature signal representative of a temperature of a process gas upstream of a contactor column of a gas dehydration unit, and a flow rate signal representative of a flow rate of the process gas upstream of the contactor column. The process gas is cross-contacted with TEG within the contactor column to reduce water content of the process gas to satisfy a threshold water content. Using the temperature signal and the flow rate signal, the computer system periodically determines a quantity of TEG to be introduced into the contactor column to reduce the water content of the process gas to satisfy the threshold water content, and periodically controls an operation of a flow control valve configured to flow the TEG into the contactor column.

6 Claims, 4 Drawing Sheets

TRI-ETHYLENE GLYCOL CIRCULATION AUTOMATION SYSTEM AND METHOD

TECHNICAL FIELD

This disclosure relates to gas dehydration systems, and particularly to the use of tri-ethylene glycol (TEG or glycol) in gas dehydration systems.

BACKGROUND

Natural gas processing refers to the industrial processes performed on process gas produced from gas wells. A natural gas liquids (NGL) plant treats process gas, for example, by flowing the process gas through a series of fractionators that separate the mixture of hydrocarbons in the process gas into various products. Process gas that is flowed to NGL plants needs to satisfy certain thresholds such as water content in the process gas. TEG is used to control the water content in process gas.

SUMMARY

This disclosure describes TEG circulation automation systems and methods.

Certain aspects of the subject matter described here can be implemented as a computer-implemented method. A computer system periodically receives, from a temperature sensor, a temperature signal representative of a temperature of a process gas upstream of a contactor column of a gas dehydration unit. The process gas is cross-contacted with TEG within the contactor column to reduce water content of the process gas to satisfy a threshold water content. The computer system periodically receives, from a flow sensor, a flow rate signal representative of a flow rate of the process gas upstream of the contactor column. The computer system periodically determines, using the temperature signal and the flow rate signal, a quantity of TEG to be introduced into the contactor column to reduce the water content of the process gas to satisfy the threshold water content. The computer system periodically controls, based on the quantity of the TEG, an operation of a flow control valve configured to flow the TEG into the contactor column.

An aspect combinable with any other aspect includes the following features. To periodically determine the quantity of TEG to be introduced, the computer system executes the equation $W_{LD}=9.6524 \times e^{0.0286 \times T}$, where $W_{LD}$ is a gas water load representing water content in the process gas upstream of the contactor column, and T is the temperature of the process gas upstream of the contactor column represented by the temperature signal. The computer system also executes the equation $$\text{TEG Circulation Rate} = V_{Gas} \times 2.1 \times \frac{W_{LD}}{1440},$$

where TEG Circulation Rate is a TEG flow rate to which the operation of the flow control valve is to be controlled so that sufficient TEG flows into the contactor column to reduce the water content of the process gas to satisfy the threshold water content.

An aspect combinable with any other aspect includes the following features. Periodically receiving the temperature signal, periodically receiving the flow rate signal, periodically determining the quantity of TEG, periodically controlling the operation of the flow control valve, and periodically executing the equations mentioned in this disclosure are performed in real time.

An aspect combinable with any other aspect includes the following features. To periodically control the operation of the flow control valve, the computer system periodically transmits instructions to open or close the flow control valve based on the determined quantity of TEG.

An aspect combinable with any other aspect includes the following features. The flow control valve is configured to be opened or closed to different levels to flow different quantities of TEG to the contactor column. An instruction to open or close the flow control valve includes a level to which the flow control valve is to be opened or closed.

An aspect combinable with any other aspect includes the following features. To periodically determine the quantity of TEG, the computer system periodically receives, from a TEG flow sensor, a TEG flow rate of the TEG into the contactor column.

An aspect combinable with any other aspect includes the following features. To periodically control the operation of the flow control valve, the computer system compares the TEG flow rate with the quantity of TEG. Based on a result of the comparing, the computer system determines a level by which the flow control valve is to be opened or closed so that the quantity of TEG introduced into the contactor column satisfies the threshold water content.

Certain aspects of the subject matter described here can be implemented as a computer-readable medium (e.g., a non-transitory computer-readable medium) storing instructions executable by one or more computers to perform the operations (e.g., the methods) described here. Certain aspects of the subject matter described here can be implemented as a computer system including one or more computers and a computer-readable storage medium (e.g., non-transitory computer-readable storage medium) executable by the one or more computers to perform the operations (e.g., the methods) described here.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Gas dehydration units are used to dry process gas, e.g., separated gas from production vessels, prior to sending the process gas to natural gas liquids (NGL) plants. A maximum amount of water that the process gas can have is fixed, for example, at 7 pounds (lbs) per million standard cubic feet (MMSCF). A gas dehydration unit includes a contactor column through which the process gas and TEG are fed to dehydrate the process gas. Often, the quantity of TEG fed into the contactor column is determined based on the water load (or water content) in the process gas upstream of the contactor column and manually set at the beginning of the dehydration process. Whereas the water content in the process gas may change over time (e.g., due to changes in process conditions, environmental factors or other reasons), the quantity of TEG would remain the same. The result of retaining the quantity of TEG constant is off-spec gas being fed to the NGL plants.

This disclosure describes TEG circulation automation methods and systems in which process gas upstream of the contactor column is periodically monitored, and the quantity of the TEG is responsively updated so that the water content of the process gas that exits the contactor column satisfies a water content threshold. Implementing the techniques described here can automate TEG circulation based on process gas conditions at the inlet to the contactor column. The techniques can be implemented to supply only the required amount of TEG, to maintain produced gas quality, avoid excessive TEG carryover and minimize human interference.

Figure 1:
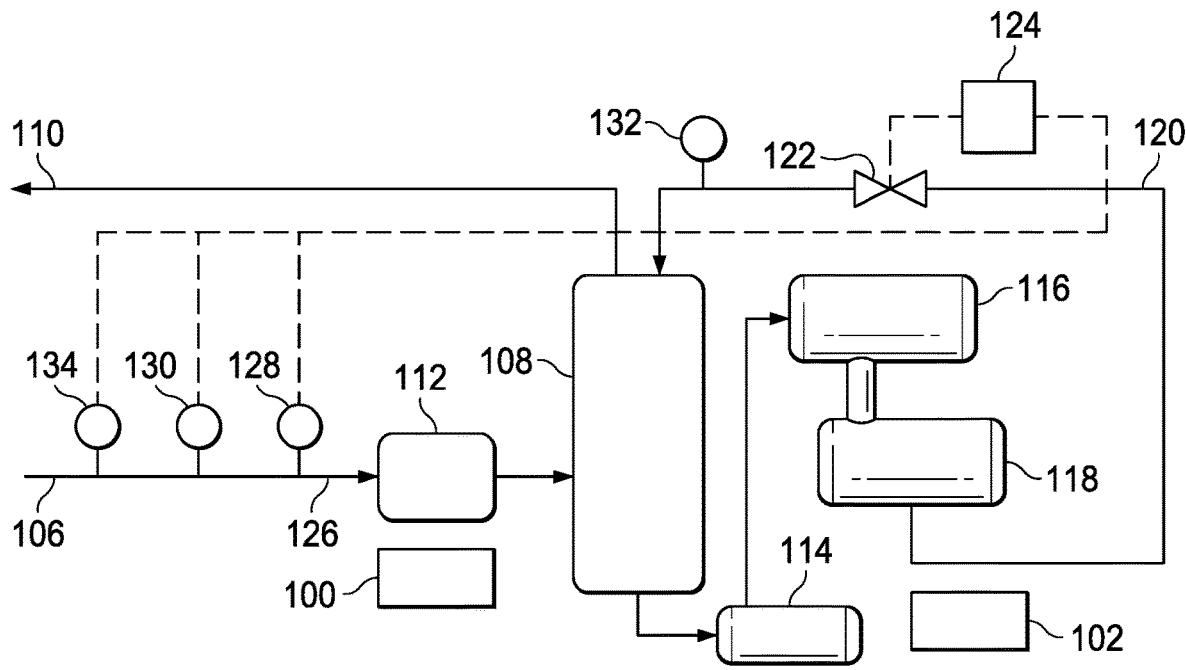
FIG. 1 is schematic diagram of gas dehydration and TEG regeneration implementing TEG circulation automation.

FIG. 1 is schematic diagram of gas dehydration and TEG regeneration implementing TEG circulation automation. Gas dehydration is implemented by a gas dehydration unit 100, and TEG regeneration is implemented by a TEG regeneration unit 102. In operation, process gas 106 is flowed (e.g., from a gas well or from a process gas storage facility) through a contactor column 108. The process gas 106 has a certain water content (or water load) that needs to be reduced before the process gas 106 can be flowed to a NGL plant (not shown), as represented by the directional arrow 110. In some instances, the process gas 106 can be flowed through a filter 112 upstream of the contactor column 108. TEG is used as a drying media to dry (i.e., remove water from) the process gas 106. To do so, a TEG stream is flowed through the contactor column 108. In particular, the TEG stream is counter-flowed (i.e., flowed in an opposite direction) relative to the process gas 106. The dehydrated process gas 106 is diverted to the NGL plant through high pressure compressors (not shown).

The TEG stream exiting the contactor column 108 is rich glycol which includes TEG, water and hydrocarbons. The rich glycol stream is passed through a flash drum 114 and a re-boiler 116 to remove the hydrocarbon and water. In some instances, the rich glycol stream can be filtered after the flash drum 114 and before the re-boiler 116. The resulting stream is lean glycol that includes TEG having a purity as high as 99.9%. The TEG level can be reduced in an accumulator 118 where a quantity of TEG can be made up by transferring TEG from a storage tank. The TEG is then re-circulated through the contactor column 108, and the gas dehydration and TEG regeneration processes are repeated.

During gas dehydration, the TEG is flowed through a flow pathway 120 (e.g., a tubular or a pipe) having an outlet coupled to an inlet (not shown) in the contactor column 108. A flow control valve (FCV) 122 is installed in and fluidically coupled to the flow pathway 120. The FCV 122 can be opened or closed between a fully open position and a fully closed position. In the fully open position, the FCV 122 is 100% open, and in the fully closed position, the FCV is 100% closed. The FCV 122 can be positioned at one of multiple intermediate positions between the fully open position and the fully closed position. The intermediate positions represent different levels of the FCV 122 being open (or closed) to permit different quantities of TEG to flow through the flow pathway 122. In some implementations, the FCV 122 can be computer-controlled such that the FCV 122 can open to different intermediate positions based on signals received from a control system 124 (described below).

In some implementations, a control system 124 is operatively coupled to the FCV 122. The control system 124 can be implemented as a computer system that includes one or more computers and a computer-readable storage medium (e.g., non-transitory computer-readable storage medium) storing instructions executable by the one or more computers to perform operations described in this disclosure. Alternatively or in addition, the control system 124 can be implemented as processing circuitry, software, firmware, hardware or combinations of them with or without the computer system to perform operations described in this disclosure. For example, the control system 124 can implement automatic control of the quantity of TEG flowed to the contactor column 108 by automatically varying a level by which the FCV 122 is opened or closed.

In some implementations, a flow pathway 126 through which the process gas 106 is flowed to the contactor column 108 can be operatively coupled to multiple sensors that can collectively sense properties of the process gas 106 being fed into the contactor column 108. The sensors include a temperature sensor 128 that senses the temperature of the process gas upstream of the contactor column 108. The sensors include a flow sensor 130 that senses a flow rate of the process gas 106 upstream of the contactor column 108. In some instances, the sensors can include a pressure sensor 134 that senses a pressure of the process gas 106 upstream of the contactor column 108. In some instances, the pressure sensed by the pressure sensor 134 and the flow rate sensed by the flow sensor 130 can both be used to control the operation of the FCV 122. In some instances, either the pressure sensor 134 or the flow sensor 130, but not both, can be used. When the pressure sensor 134, but not the flow sensor 130, is used flow rate can be determined based on the pressure and the cross-sectional area of the flow path way 126. In some implementations, all sensors used to sense properties of the process gas can be located upstream of the contactor column 108, specifically immediately before or near the inlet to the contactor column 108. Also, all such sensors can be located next to each other such that the sensors measure properties of the same or substantially same volume of the process gas 106.

In some implementations, a glycol flow sensor 132 is operatively coupled to the flow pathway 120 upstream of the contactor column 108. The glycol flow sensor 132 senses a flow rate of the TEG flowed into the contactor column 108. Alternatively or in addition, one or more other sensors (e.g., a pressure sensor) can be operatively coupled to the flow pathway 120 upstream of the contactor column 108 and be used to sense flow parameters of the TEG stream (e.g., pressure through the flow pathway 120) using which the flow rate of the TEG into the contactor column 108 can be determined.

In operation, the sensors operatively coupled to the flow pathway 126 transmit sensed signals representative of properties of the process gas 106 (e.g., temperature, pressure, flow rate, or any combination of them) to the control system 124. The sensor or sensors operatively coupled to the flow pathway 120 similarly transmit sensed signals representative of a flow rate of the TEG to the control system 124. Using the properties of the process gas 106, the control system 124 determines a water content of the process gas 106 that is being fed to the contactor column 108. Based on the determined water content, the control system 124 determines a quantity of TEG that needs to be flowed through the contactor column 108 (Quantity$_{Needed}$) to reduce the water content of the inlet process gas 106 to satisfy a threshold water content. In parallel (or in sequence), the control system 124 determines a quantity of the TEG actually being flowed into the contactor column 108 (Quantity$_{Actual}$) using the signals transmitted by the sensor operatively coupled to the flow pathway 120. By comparing Quantity$_{Actual}$ and Quantity$_{Needed}$, the control system 124 determines if the FCV 122 needs to be further opened or closed to flow more or less TEG into the contactor column 108. Based on the determination, the control system 124 transmits signals/instructions to open or close the FCV 122 to a level at which the requisite amount of TEG is flowed into the contactor column 108.

Figure 2:
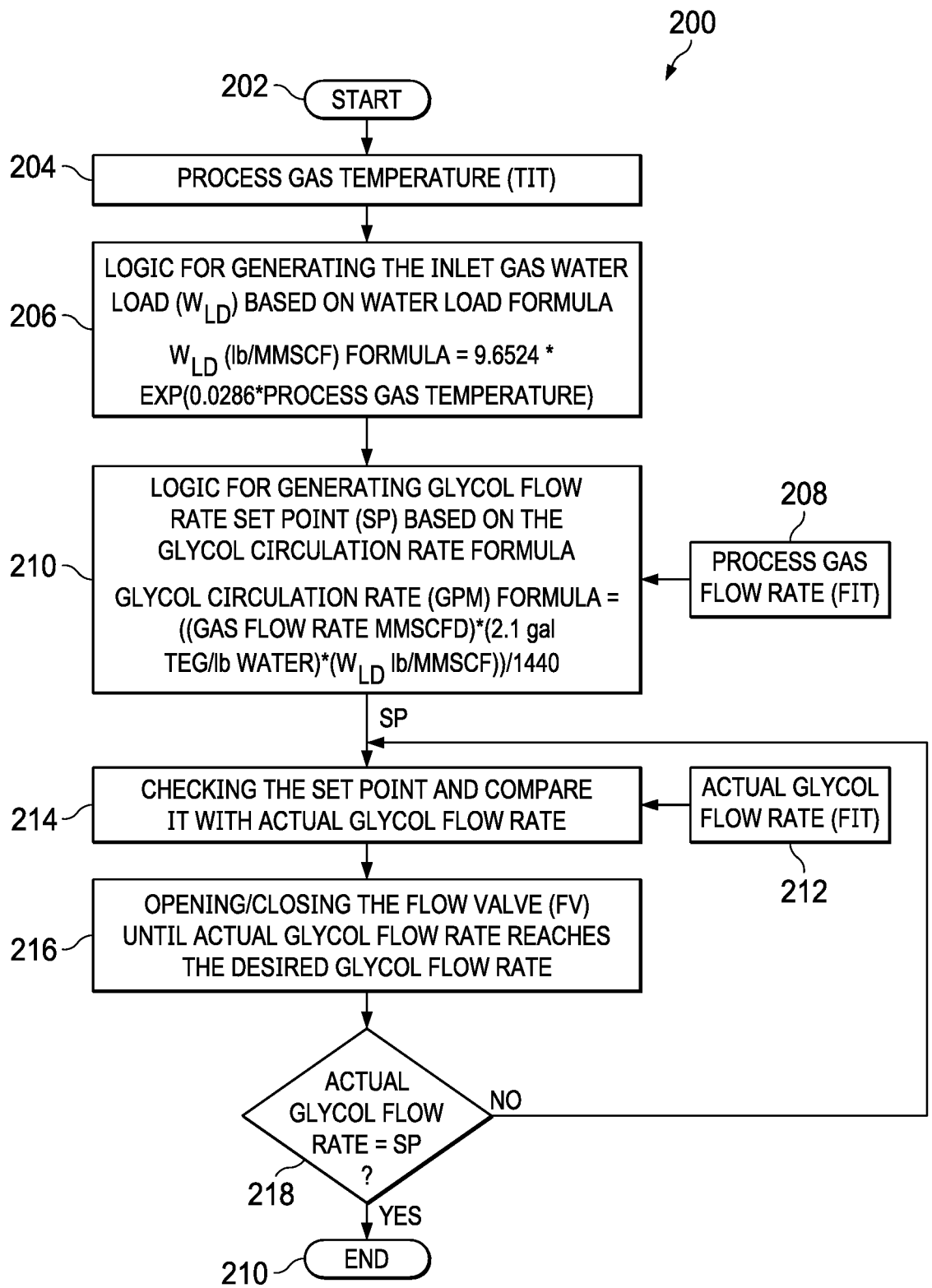
FIG. 2 is a flowchart of an example of a process of implementing TEG circulation automation.

FIG. 2 is a flowchart of an example of a process 200 of implementing TEG circulation automation. The process 200 can be implemented by the control system 124 operating in conjunction with other components described with reference to FIG. 1. At 202, the process starts. At 206, the control system 124 receives a signal representative of the process gas temperature, e.g., the temperature of the process gas 106 sensed by the temperature sensor 128. At 206, the control system 124 implements logic to generate an inlet gas water load (W$_{LD}$) based on a water load formula shown in Equation 1:

$$W_{LD} = 9.6524 \times e^{0.0286 \times T} \qquad \text{(Equation 1)}$$

In Equation 1, T is the process gas temperature received by the temperature sensor 128. The water load (or water content) W$_{LD}$ is measured in lbs/MMSCF.

At 208, the control system 124 receives a signal representative of the process gas flow rate (V$_{Gas}$), e.g., a flow rate of the process gas 106 sensed by the flow sensor 130. At 210, the control system 124 implements logic to generate a TEG flow rate Set Point (SP) based on a TEG circulation rate formula shown in Equation 2:

$$TEG \text{ Circulation Rate} = V_{Gas} \times 2.1 \times \frac{W_{LD}}{1440} \qquad \text{(Equation 2)}$$

In Equation 2, TEG Circulation Rate is measured in gallons per minute (GPM), V$_{Gas}$ is measured in million standard cubic feet per day (MMSCFD). The constant (2.1) represents gallons of TEG per pound of water.

At 212, the control system 124 receives a signal representative of the actual TEG circulation rate into the contactor column 108, e.g., a flow rate of the TEG stream flowed through the flow pathway 120 sensed by the flow sensor 132. At 214, the control system 124 checks the SP determined by executing Equation 2 and compares the SP with the actual TEG circulation rate determined from the signal received from the flow sensor 132. At 216, the control system 124 transmits instructions/signals to the FCV 122 to open or close the FCV 122 until the actual TEG circulation rate reaches the SP determined by executing Equation 2.

In some implementations, the FCV 122 can include or be operatively coupled to a servo motor or a solenoid that can receive the instructions/signals from the control system 124. The instructions/signals can include (e.g., encode) a level by which the FCV 122 should be opened or closed so that the actual TEG circulation rate matches the SP. The servo motor or the solenoid can convert the level included in the instructions/signals to a position of the FCV 122 that corresponds to the received level. As the FCV 122 receives instructions/signals with different levels, the FCV 122 can modify the open/close position to a position that corresponds to the received level.

At 218, the control system 124 checks if the actual TEG circulation rate has reached the SP. To do so, the control system 124 can repeat steps 214 and 216 until the actual TEG circulation rate has reached the SP. The actual TEG circulation rate reaching the SP does not mean that the two values need to be identical. Instead, the control system 124 can be programmed to store an acceptable difference between the actual TEG circulation rate and the SP. Once the control system 124 determines that the difference between the actual TEG circulation rate and the SP is at or below the acceptable difference, the control system 124 can determine that the actual TEG circulation rate has reached the SP. In response to determining that the actual TEG circulation rate has reached the SP (decision branch "Yes"), the process ends at 210. In response to determining that the actual TEG circulation rate has not reached the SP (decision branch "No"), the control system 124 continues to implement steps 214 and 216.

In some implementations, the control system 124 uses the SP value determined at step when implementing steps 214 and 216 until the actual TEG circulation rate reaches the SP. In some implementations, the control system 124 re-determines W$_{LD}$ (step 206) and SP (step 210) for each instance of implementing steps 214 and 216 until the actual TEG circulation rate reaches the SP.

In operation, the sensors periodically transmit signals to the controller 124. In the context of this disclosure, "periodically" means once per second, once per few seconds (e.g., seconds, 30 seconds, 45 seconds), once per minute, once per few minutes (e.g., 2 minutes, 5 minutes, 10 minutes) or other frequency determined by the operator of the control system 124. The control system 124 periodically processes the signals and periodically executes Equations 1 and 2 at the same frequency at which the control system 124 receives the signals.

In some implementations, the control system 124 can process the signals to execute Equations 1 and 2 in real-time. For the purposes of this disclosure, the terms "real-time," "real time," "realtime," "real (fast) time (RFT)," "near(ly) real-time (NRT)," "quasi real-time," or similar terms (as understood by one of ordinary skill in the art) mean that an action and a response are temporally proximate such that an individual perceives the action and the response occurring substantially simultaneously. For example, the time difference between the control system 124 receiving signals from the sensors and executing Equations 1 and 2 using the values represented by the signals may be less than 1 ms, less than 1 sec., less than 5 secs., etc. While the control system 124 need not process the signals and execute Equations 1 and 2 instantaneously, the control system 124 does so without any intentional delay between receiving the signals and executing the Equations, taking into account processing limitations of a described computing system and time required to, for example, gather, accurately measure, analyze, process, store, or transmit (or a combination of these or other functions) the data.

Figure 3:
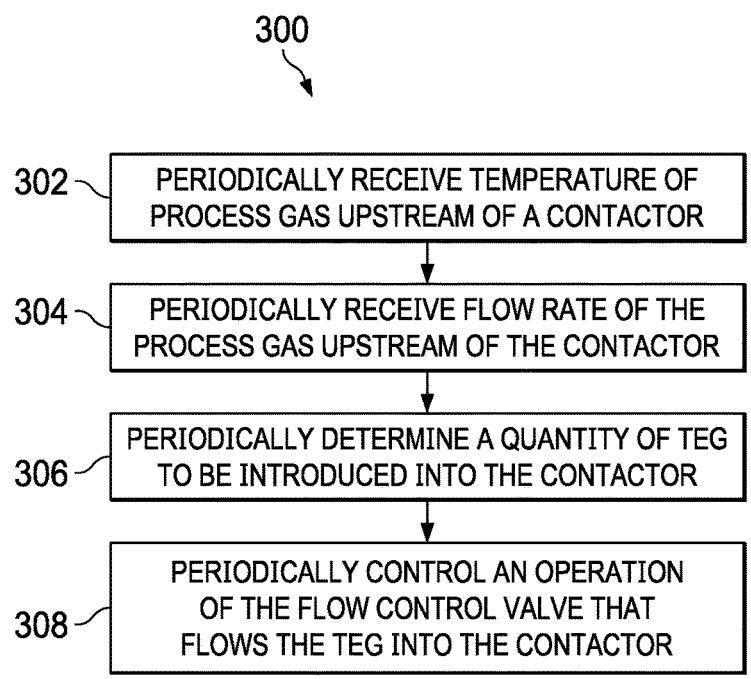
FIG. 3 is a flowchart of an example of a process of implementing TEG circulation automation.

FIG. 3 is a flowchart of an example of a process 300 of implementing TEG circulation automation. In some implementations, the control system 124 can implement the process 300. At 302, the control system 124 periodically receives a temperature signal (e.g., temperature signal received from the temperature sensor 128) representative of a temperature of a process gas (e.g., process gas 106) upstream of a contactor column (e.g., contactor column 108) of a gas dehydration unit (e.g., gas dehydration unit 100). As described above, the process gas 106 is cross-contacted with TEG within the contactor column 108 to reduce water content (or water load) of the process gas 106 to satisfy a threshold water content (Set Point). At 304, the control system 124 periodically receives a flow a flow rate signal (e.g., flow rate signal received from the flow sensor 130) upstream of the contactor column (e.g., the contactor column 108). At 306, the control system 124 periodically determines, using the temperature signal and the flow rate signal, a quantity of TEG (Set Point) to be introduced into the contactor column to reduce the water content of the process gas 106 to satisfy the threshold water content. At 308, the control system 124 periodically controls an operation of a flow control valve (e.g., FCV 122) to flow the TEG into the contactor column 108.

As described above, to periodically determine the quantity of TEG to be introduced into the contactor column, the control system 124 periodically executes Equations 1 and 2 in real-time. Also, as described above, to periodically control the operation of the flow control valve, the control system periodically transmits instructions/signals to open or close the flow control valve based on the determined quantity of TEG. The flow control valve can be opened or closed to different levels to flow different quantities of TEG to the contactor column. An instruction/signal to open or close the flow control valve includes a level to which the flow control valve is to be opened or closed.

Figure 4:
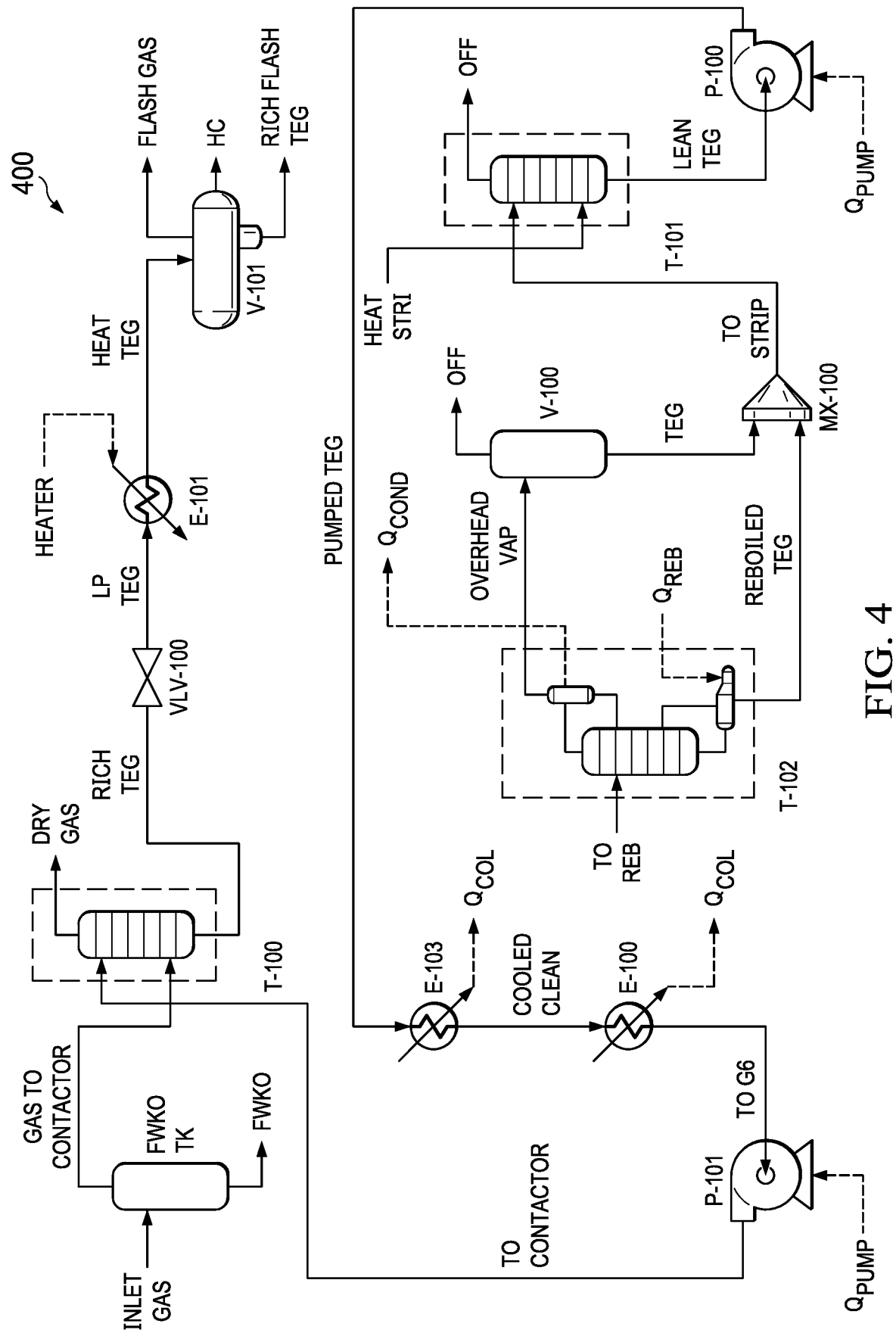
FIG. 4 is an example of chemical process simulation diagram that simulates TEG flow through a gas dehydration unit.
Figure 5:
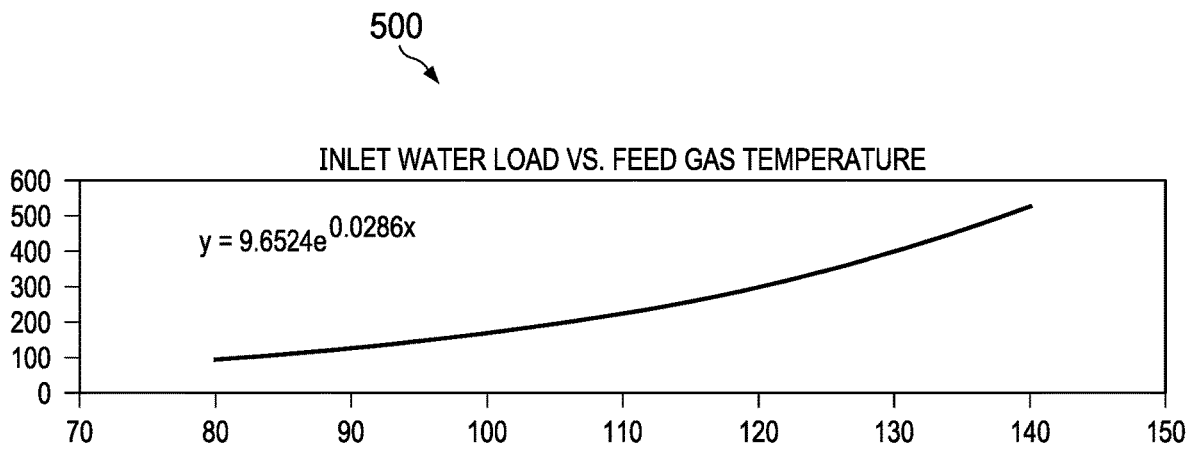
FIG. 5 is a plot of water load versus feed gas temperature.

In the following paragraphs, techniques implemented to develop Equations 1 and 2 are described. FIG. 4 is an example of chemical process simulation diagram that simulates TEG flow through a gas dehydration unit. The chemical process simulation can be implemented by known simulation software, such as Hysys. FIG. 4 shows a model 400 that was developed for the TEG regeneration unit 102 to study the effect of changing the circulation rate on other process variables such as water load and TEG consumption. Using the model 400, a case study was built to extract the relation between the temperature and water load of the process gas entering a contactor column. FIG. 5 is a plot 500 of water load (Y-axis) versus feed gas temperature (X-axis) generated based on the extracted relationship. Coefficients of the curve shown in plot 500 were used to generate Equation 1.

Figure 6:
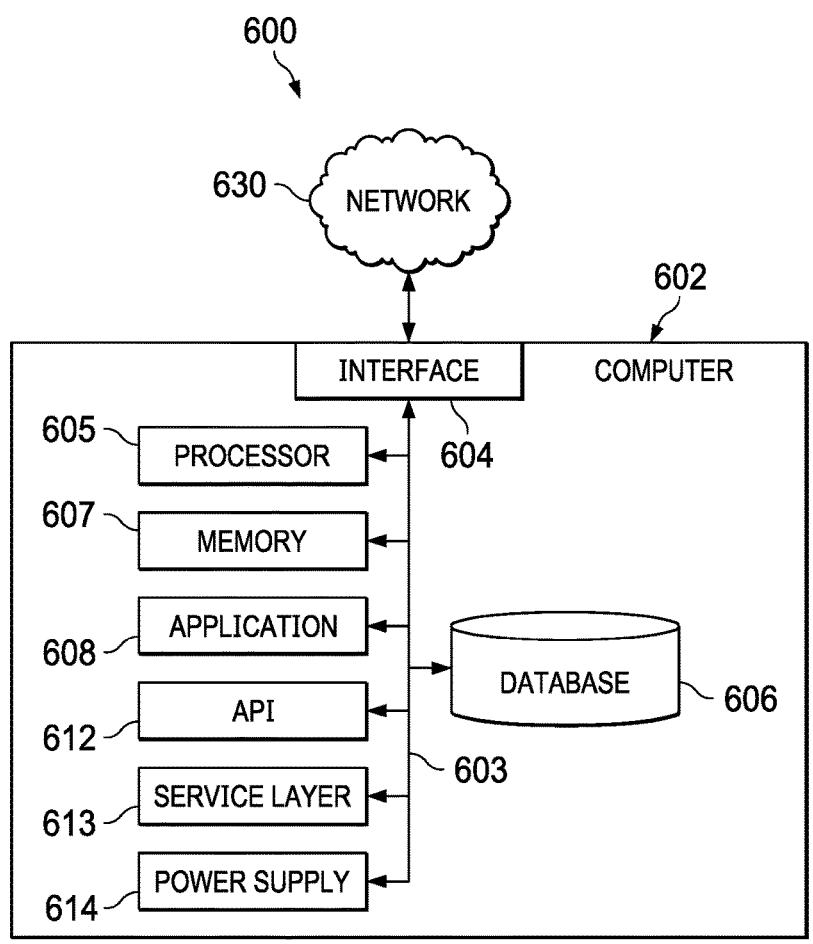
FIG. 6 is a block diagram of an example computer system that can be used to provide computational facilities associated with described algorithms, methods, functions, processes, flows, and procedures, according to some implementations of the disclosure.

FIG. 6 is a block diagram of an example computer system that can be used to provide computational facilities associated with described algorithms, methods, functions, processes, flows, and procedures, according to some implementations of the disclosure. In some implementations, the control system 124 can be the computer system 600, include the computer system 600. The sensors described in this disclosure can communicate with the computer system 600.

The illustrated computer 602 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 602 can include a Smart Embedded Management Agent (SEMA), such as a built-in ADLINK SEMA 2.2, and a video sync technology, such as Quick Sync Video technology supported by ADLINK MSDK+. In some examples, the computer 602 can include the MXE-5400 Series processor-based fanless embedded computer by ADLINK, though the computer 602 can take other forms or include other components.

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus. In some implementations, any or all of the components of the computer 602, including hardware or software components, can interface with each other or the interface 604 (or a combination of both), over the system bus. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs 612.

The service layer 613 can provide software services to the computer 602 and other components (whether illustrated or not) that are communicably coupled to the computer 602. The functionality of the computer 602 can be accessible for all service consumers using this service layer 613. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 can include an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor in FIG. 6, two or more processors 605 can be used according to particular needs, desires, or particular implementations of the computer 602 and the described functionality. Generally, the processor 605 can execute instructions and manipulate data to perform the operations of the computer 602, including operations using algorithms, methods, functions, processes, flows, and procedures as described in the present disclosure.

The computer 602 can also include a database 606 that can hold data for the computer and other components connected to the network 630 (whether illustrated or not). For example, database 606 can be an in-memory, conventional, or a database storing data consistent with the present disclosure. In some implementations, the database 606 can be a combination of two or more different database types (for example, hybrid in-memory and conventional databases) according to particular needs, desires, or particular implementations of the computer 602 and the described functionality. Although illustrated as a single database in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

An application 608 can be an algorithmic software engine providing functionality according to particular needs, desires, or particular implementations of the computer 602 and the described functionality. For example, an application 608 can serve as one or more components, modules, or applications 608. Multiple applications 608 can be implemented on the computer 602. Each application 608 can be internal or external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system including computer 602, with each computer 602 communicating over network 630. Further, the terms "client", "user", and other appropriate terminology can be used interchangeably without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware; in computer hardware, including the structures disclosed in this specification and their structural equivalents; or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus", "computer", and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus and special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document; in a single file dedicated to the program in question; or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes; the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks, optical memory devices, and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), or a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network.

Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations; and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A computer-implemented method comprising:
    periodically receiving, by a computer system and from a temperature sensor, a temperature signal representative of a temperature of a process gas upstream of a contactor column of a gas dehydration unit, wherein the process gas is cross-contacted with tri-ethylene glycol (TEG) within the contactor column to reduce water content of the process gas to satisfy a threshold water content;
    periodically receiving, by the computer system and from a flow sensor, a flow rate signal representative of a flow rate of the process gas upstream of the contactor column;
    periodically determining, by the computer system and using the temperature signal and the flow rate signal, a quantity of TEG to be introduced into the contactor column to reduce the water content of the process gas to satisfy the threshold water content; and
    periodically controlling, by the computer system and based on the quantity of the TEG, an operation of a flow control valve configured to flow the TEG into the contactor column,
    wherein the periodically determining the quantity of TEG to be introduced comprises:
        executing the equation $W_{LD}=9.6524 \times e^{0.0286 \times T}$, where $W_{LD}$ is a gas water load representing water content in the process gas upstream of the contactor column measured in pounds per million standard cubic feet (lbs/MMSCF), and T is the temperature of the process gas upstream of the contactor column measured in degree Celsius (C) represented by the temperature signal; and
        executing the equation $$TEG \text{ Circulation Rate} = V_{Gas} \times 2.1 \times \frac{W_{LD}}{1440},$$

where TEG Circulation Rate is a TEG flow rate measured in gallons per minute (GPM) to which the operation of the flow control valve is to be controlled so that sufficient TEG flows into the contactor column to reduce the water content of the process gas to satisfy the threshold water content, and $V_{Gas}$ is measured in million standard cubic feet per day (MMSCFD).

2. The computer-implemented method of claim 1, wherein the periodically receiving the temperature signal, periodically receiving the flow rate signal, periodically determining the quantity of TEG, periodically controlling the operation of the flow control valve, the executing the equation $W_{LD}=9.6524 \times e^{0.0286 \times T}$, and the executing the equation $$TEG\text{ Circulation Rate} = V_{Gas} \times 2.1 \times \frac{W_{LD}}{1440}$$

are performed in real time, where $W_{LD}$ is measured in pounds per million standard cubic feet (lbs/MMSCF), T is measured in degree Celsius (° C.), TEG Circulation Rate is measured in gallons per minute (GPM), and $V_{Gas}$ is measured in million standard cubic feet per day (MMSCFD).

3. The computer-implemented method of claim 1, wherein the periodically controlling the operation of the flow control valve comprises periodically transmitting instructions to open or close the flow control valve based on the determined quantity of TEG.

4. The computer-implemented method of claim 3, wherein the flow control valve is configured to be opened or closed to different levels to flow different quantities of TEG to the contactor column, wherein an instruction to open or close the flow control valve includes a level to which the flow control valve is to be opened or closed.

5. The computer-implemented method of claim 3, wherein the periodically determining the quantity of TEG comprises periodically receiving, from a TEG flow sensor, a TEG flow rate of the TEG into the contactor column.

6. The computer-implemented method of claim 5, wherein the periodically controlling the operation of the flow control valve comprises:
comparing the TEG flow rate with the quantity of TEG; and
determining, based on a result of the comparing, a level by which the flow control valve is to be opened or closed so that the quantity of TEG introduced into the contactor column satisfies the threshold water content.

* * * * *